United States Patent
Kang et al.

(10) Patent No.: US 10,051,013 B2
(45) Date of Patent: Aug. 14, 2018

(54) METHOD AND APPARATUS FOR STREAMING MULTIMEDIA CONTENT OF SERVER BY USING CACHE

(71) Applicant: Samsung Electronics Co., Ltd., Suwon-si, Gyeonggi-do (KR)

(72) Inventors: Pil-seob Kang, Suwon-si (KR); Han-min Bang, Gangneung-si (KR); Seong-il Hahm, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 14/154,475

(22) Filed: Jan. 14, 2014

(65) Prior Publication Data

US 2014/0244727 A1 Aug. 28, 2014

(30) Foreign Application Priority Data

Feb. 22, 2013 (KR) .................. 10-2013-0019379

(51) Int. Cl.
*H04L 29/06* (2006.01)

(52) U.S. Cl.
CPC ...... *H04L 65/1069* (2013.01); *H04L 65/4084* (2013.01); *H04L 65/602* (2013.01); *H04L 65/80* (2013.01)

(58) Field of Classification Search
CPC . H04L 65/1069; H04L 65/80; H04L 65/4084; H04L 65/602
See application file for complete search history.

(56) References Cited

U.S. PATENT DOCUMENTS

| 6,377,972 | B1 | 4/2002 | Guo et al. |
| 6,553,376 | B1* | 4/2003 | Lewis ............... G06F 17/30902 |
| 8,046,483 | B2 | 10/2011 | Park |
| 8,301,825 | B2 | 10/2012 | Wittenburg et al. |
| 2004/0138948 | A1* | 7/2004 | Loomis .................. G11B 20/10 700/94 |
| 2006/0236046 | A1* | 10/2006 | Bowers ................ H04N 19/172 711/159 |
| 2006/0288119 | A1* | 12/2006 | Kim .................... H04L 67/2842 709/238 |
| 2009/0204630 | A1 | 8/2009 | Lai et al. |
| 2009/0282159 | A1* | 11/2009 | Wang .................... H04L 61/609 709/231 |

(Continued)

FOREIGN PATENT DOCUMENTS

KR 2006-0078648 A 7/2006

*Primary Examiner* — Chris Parry
*Assistant Examiner* — Soe M Hlaing
(74) *Attorney, Agent, or Firm* — Jefferson IP Law, LLP

(57) ABSTRACT

A technology for a client streaming content of a server is provided. The technology includes a service installed in the client that receives the content from the server instead of a media player, downloads the content in a cache having a larger capacity than a memory buffer of the media player, and then transfers data stored in the cache to the media player. Accordingly, even when the memory buffer is full, data reception from the server is not stopped, and thus power consumption of the server and the client may be reduced. Also, since a connection to the server is performed by the service instead of the media player, various socket interfaces may be supported without having to change the media player, and since data is stored in the cache, a buffering time may be reduced.

15 Claims, 10 Drawing Sheets

(56) References Cited

U.S. PATENT DOCUMENTS

| | | |
|---|---|---|
| 2010/0088463 A1 | 4/2010 | Im et al. |
| 2010/0153415 A1* | 6/2010 | Muntz ................ H04L 67/1097 707/758 |
| 2011/0087842 A1* | 4/2011 | Lu ..................... G06F 17/30902 711/126 |
| 2011/0106964 A1 | 5/2011 | Bennett et al. |
| 2011/0118858 A1 | 5/2011 | Rottler et al. |
| 2011/0153856 A1 | 6/2011 | Piepenbrink et al. |
| 2012/0011281 A1* | 1/2012 | Hamada ............. H04L 61/2517 709/246 |
| 2012/0072527 A1* | 3/2012 | Harvell ............. G06F 17/30902 709/214 |
| 2012/0254755 A1 | 10/2012 | Wohlert |
| 2012/0272116 A1* | 10/2012 | Chen .................. H03M 13/353 714/752 |

\* cited by examiner

METHOD AND APPARATUS FOR STREAMING MULTIMEDIA CONTENT OF SERVER BY USING CACHE

CROSS-REFERENCE TO RELATED PATENT APPLICATION(S)

This application claims the benefit under 35 U.S.C. § 119(a) of a Korean patent application filed on Feb. 22, 2013 in the Korean Intellectual Property Office and assigned Serial No. 10-2013-0019379, the entire disclosure of which is hereby incorporated by reference.

TECHNICAL FIELD

The present disclosure relates to playing multimedia content. More particularly, the present disclosure relates to a method and apparatus for playing multimedia content via streaming

BACKGROUND

Streaming is a technology enabling a client receiving multimedia content to play content upon receiving only a portion of the content before downloading the entire content from a media server. A media player installed in a client uses an address of the content, for example, a Universal Resource Locator (URL), to play the content in a server, and many media players use a Hypertext Transfer Protocol (HTTP) to obtain the content indicated by the URL. In other words, the media player of the client starts to receive a front portion of the content in the media server according to an HTTP request. The media player sets a decoder by analyzing header information included in the front portion of the content so as to prepare an environment for playing an image. Also, the decoder sets a capacity of a memory buffer so that the image is smoothly played according to a bit rate of the content. After the capacity of the buffer is set, Audio/Video (AN) data needs to be stored in a play order in the buffer, and at this time, index information (for example, MOOVatom) of the AN data is required. However, when multimedia content is not suitable for HTTP-based streaming, index information may exist in a location (for example, an end portion of content data) other than a header portion of the multimedia content. In this case, a decoder reads only a bitstream of index information stored in a certain location from a server by using a range option of HTTP. In other words, when content is not suitable for HTTP-based streaming, a media player may perform operations regarding a request to read header information, a request to read index information, and a request to sequentially store data in a buffer based on the index information. Such a plurality of requests may be generated simultaneously or one request may be generated after a session corresponding to another request is ended. When the plurality of requests are generated simultaneously, data is repeatedly received if several HTTP requests request a server for the same bitstream region, and thus network bandwidth resources are wasted, thereby increasing a time (e.g., an initial buffering time) taken to receive minimum data that is required for playing the content. Also, even when the one request is generated after a session corresponding to another request is ended, an initial buffering time is increased since disconnecting and connecting are repeatedly performed.

Generally, a media player includes a buffer for playing content, wherein data is accumulated in the buffer and the content is played when the data is accumulated to a predetermined threshold value or above. However, since most media players use a buffer having a very small limited memory compared to a size of media content, the buffer may be full upon receiving only some data of the media content, and the media players are unable to receive any more data or start to play the media content. The media players start to accumulate the data in the buffer after using the data stored in the buffer to some degree. When the memory of the buffer is small compared to the size of the media content, the data of the media content is received and stored in the buffer little by little through a network while playing the media content, and thus a network usage time of a client is increased, thereby increasing power consumption. Moreover, when data reception is temporally stopped, a Transmission Control Protocol (TCP) connection reduces a size of a congestion window, and thus even when the data reception is resumed, it takes time to recover the congestion window, thereby wasting network bandwidth resources.

Meanwhile, since most media players use an HTTP for streaming, these media players attempt to connect to a server by using a TCP socket. However, if the server does not support the TCP socket, it is difficult for the media players to stream content of the server. For example, when a server and a client are not connected to a same local network, the client should be aware of an Internet Protocol (IP) address and a port number connectable through a Network Address Translation (NAT) traversal. However, if there is a firewall, a connection is not successful even when the client is aware of the IP address and the port number, and a media player may use a User Datagram Protocol (UDP) socket or a logical socket connectable to a relay server using a public IP address. However, a media player that supports only HTTP streaming is unable to connect to such a server. Here, a function of supporting a new socket may be added to a media player, but it is practically difficult to modify all media players.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for reducing a buffering time when a client streams multimedia content stored in a server.

In accordance with an aspect of the present disclosure, a method of controlling a media player for streaming content of a server, the method performed by a service of a client is provided. The method includes transmitting a cache address including a content address of content on the server as a parameter and indicating the service to the media player, as the content address, downloading the content from the server to a cache that is a storage space independent from a memory buffer of the media player in the client, and streaming the content stored in the cache to the media player in response to an access request for the cache address.

The transmitting of the cache address may include receiving an inquiry about the cache address from an application for requesting the media player to stream the content, and notifying the application about the cache address in response to the inquiry on the cache address, wherein the downloading may be triggered by the inquiry about the cache address.

The downloading may include receiving the access request for the cache address from the media player, searching for the content in the cache by referring to the parameter of the cache address, and requesting the server for a portion of data of the content not stored in the cache according to a result of the searching for the content.

The method further comprises receiving the access request for the cache address from the media player, and searching for the content in the cache by referring to the parameter of the cache address, wherein, if all of the data of the content is stored in the cache according to a result of the searching for the content, streaming the content stored in the cache to the media player, in response to the access request for the cache address, without requesting the server for any of the data of the content.

The cache address may include a parameter indicating a socket interface format that is not supported by the media player but is used to download the content from the server, and the downloading may include connecting to the server by referring to the parameter indicating the socket interface format.

The downloading may include, when downloading of the content is completed, starting to download other content in a playlist of the media player.

The method may further include deleting some data of the cache when an available capacity of the cache is smaller than a predetermined threshold value, wherein the downloading may include splitting and storing data of the content into a plurality of chunks, and prioritizing the plurality of chunks with respect to a preservation priority according to characteristics of each of the plurality of chunks, and the deleting may include deleting a chunk having a low priority.

The prioritizing may include prioritizing the plurality of chunks such that a priority of a chunk including header information or index information of the content is higher than a priority of a chunk including Audio/Video (A/V) data of the content.

The characteristics may include at least one of a generation time, a latest use time, a number of uses, and an attribute of information included in a corresponding chunk.

According to another aspect of the present disclosure, a non-transitory computer-readable recording medium having recorded thereon a program for executing the method is provided.

In accordance with another aspect of the present disclosure, a client is provided. The client includes at least one memory, and a processor configured to activate a service that controls a media player for streaming content of a server, by executing at least one program stored in the at least one memory, wherein the at least one program includes commands configured to perform transmitting a cache address including a content address of content on the server as a parameter and indicating the service to the media player, as the content address, downloading the content from the server to a cache that is a storage space independent from a memory buffer of the media player in the client, and streaming the content stored in the cache to the media player in response to an access request for the cache address.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with reference to the accompanying drawings, in which.

The same reference numerals are used to represent the same elements throughout the drawings.

DETAILED DESCRIPTION

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
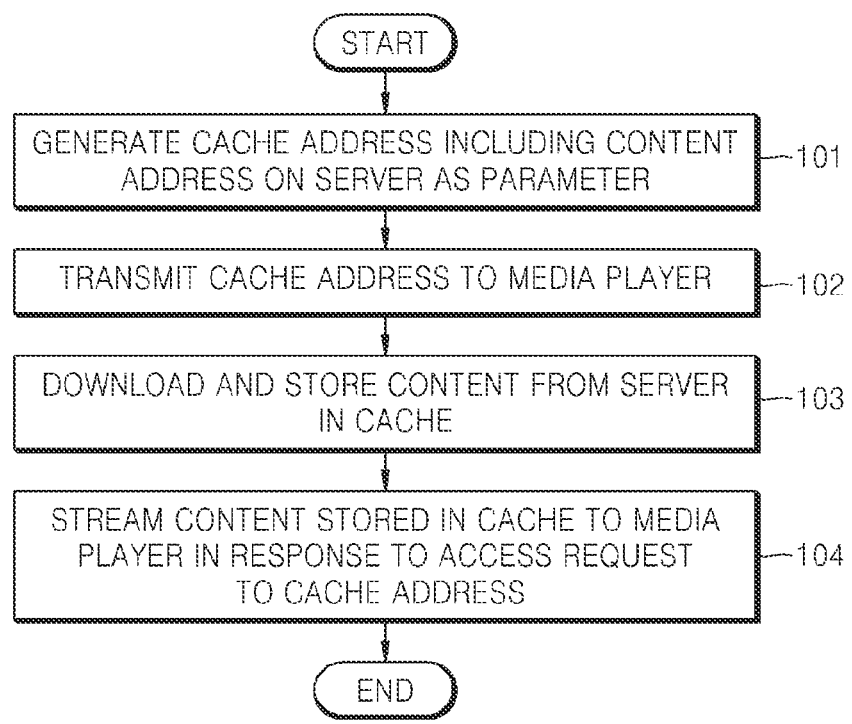
FIG. 1 is a flowchart illustrating operations of a client playing content of a server according to an embodiment of the present disclosure.

FIG. 1 is a flowchart illustrating operations of a client playing content of a server according to an embodiment of the present disclosure.

Figure 2:
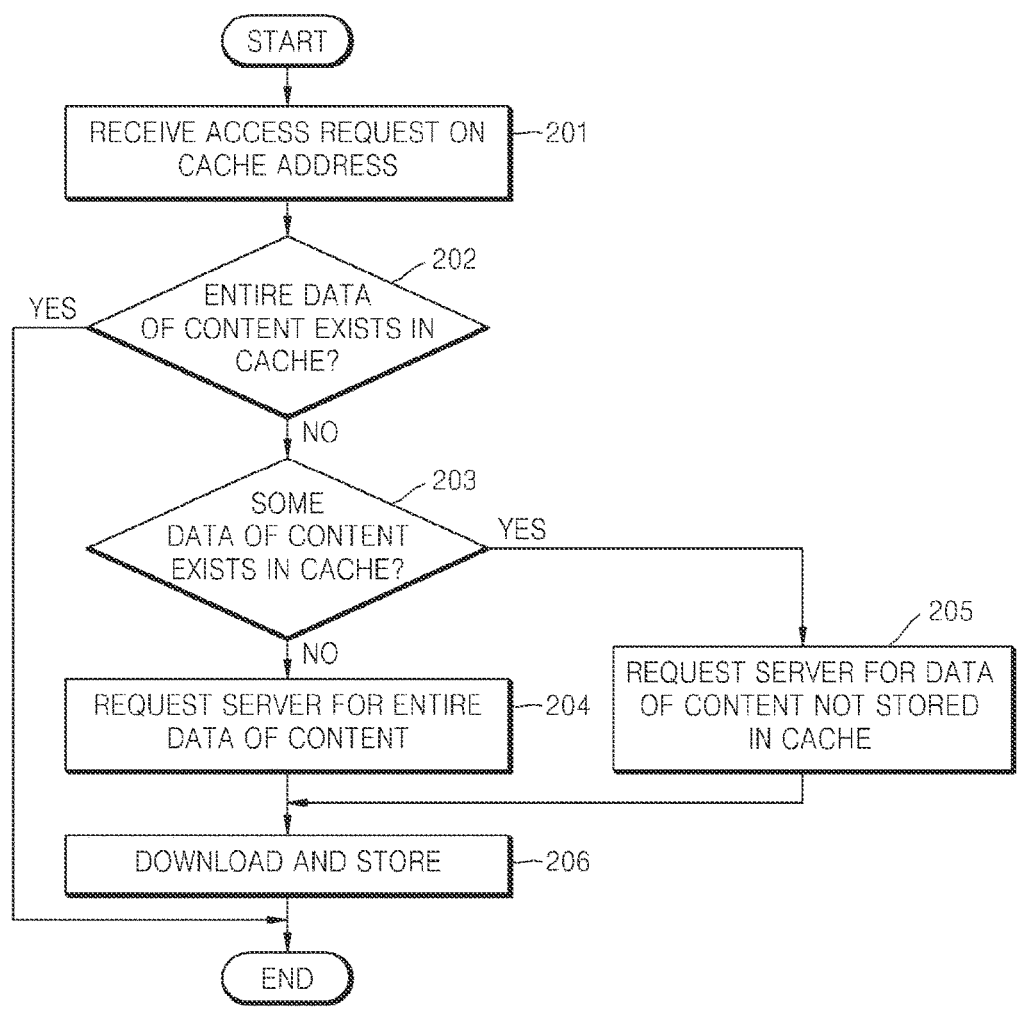
FIG. 2 is a flowchart illustrating operations of a client downloading content from a server according to an embodiment of the present disclosure.

Here, a new service installed in the client to control streaming of the client is suggested. The service denotes an application component that continuously operates without any interaction with a user and provides functionality to other applications. The meaning of the service may be clearly understood by one of ordinary skill in the art without any detailed explanation. The service suggested herein will now be referred to as a cache service. Operations in FIGS. 1 and 2 are all performed by a cache service. Also, one of ordinary skill in the art would easily understand which one of transmitting, receiving, and playing is meant by the term "streaming" without any separate explanation. Here, a client may denote a client device.

In operation 101, a cache service generates a cache address including a content address in the server as a parameter and indicating the cache service (in detail, a certain service module forming the cache service) as a destination. Here, a cache denotes a storage space classified from a memory buffer used by a media player installed in the client, and is not limited as long as the cache is a storage medium having a larger storage capacity than the memory buffer. For example, a hard disk may be used as the cache.

In operation 102, the cache service directly or indirectly transmits the cache address to the media player as a streaming address of the content. Accordingly, upon receiving the cache address, the media player recognizes the cache address as the content address on the server.

In operation 103, the cache service downloads and stores the content from the server in the cache. Here, the downloading may be performed upon receiving a streaming request from the media player or before the streaming request is received. When the downloading is performed before the streaming request is received, the content is prefetched, which will be described further below with reference to FIG. 5.

Meanwhile, other contents on a playlist including the content requested to be streamed may be pre-downloaded along with the content. For example, when a webpage provides a playlist including several music items to the media player and a user only selects one music item from the playlist, the cache service may pre-download and store other music items in the cache. In this case, even when the user selects another music item, the media player may immediately stream the selected music item from the cache without having to standby for buffering.

In operation 104, the cache service transmits (e.g., streams) the content stored in the cache to the media player upon receiving an access request, i.e., a content streaming request, on the cache address from the media player.

As such, according to the current embodiment, since the cache having a large storage space is used as a buffer instead of only using the memory buffer of the media player for buffering, data reception may not be stopped when the memory buffer is full. Also, when the same content is played at least two times, data stored in the cache is used without having to connect to the server, and thus power consumption and network resource consumption may be reduced.

In addition, since the cache service connects to the server and receives the content instead of the media player, the content may be streamed even when socket interfaces supported by the media player and the server are not compatible.

FIG. 2 is a flowchart illustrating operations of a client downloading content from a server according to an embodiment of the present disclosure. In other words, operation 103 of FIG. 1 is shown in detail in FIG. 2.

In operation 201, a cache service receives an access request regarding a cache address, i.e., a streaming request regarding content in the server.

In operation 202, the cache service determines whether entire data of the content specified by the cache address exists in the cache. As described above, since the cache address includes a content address, i.e., a Uniform Resource Locator (URL) of the content on the server, as a parameter, the content may be specified by using only the cache address. Alternatively, an Entity tag (Etag) used in Hypertext Transfer Protocol (HTTP) may be used. Alternatively, the content may be identified according to a combination of content size, a generation date, etc. If the entire data of the content exists in the cache, operation 202 is ended since the cache service does not need to connect to the server. If the entire data does not exist in the cache, operation 203 is performed.

In operation 203, it is determined whether some data of the content exists in the cache. When some data of the content is stored in the cache, operation 205 is performed, and when no data of the content is stored in the cache, operation 204 is performed.

In operation 204, the cache service connects to the server and requests the entire data of the content.

In operation 205, the cache service requests the server for data of the content that is not stored in the cache.

In operation 206, the cache service downloads and stores the data of the content from the server in the cache.

Figure 3:
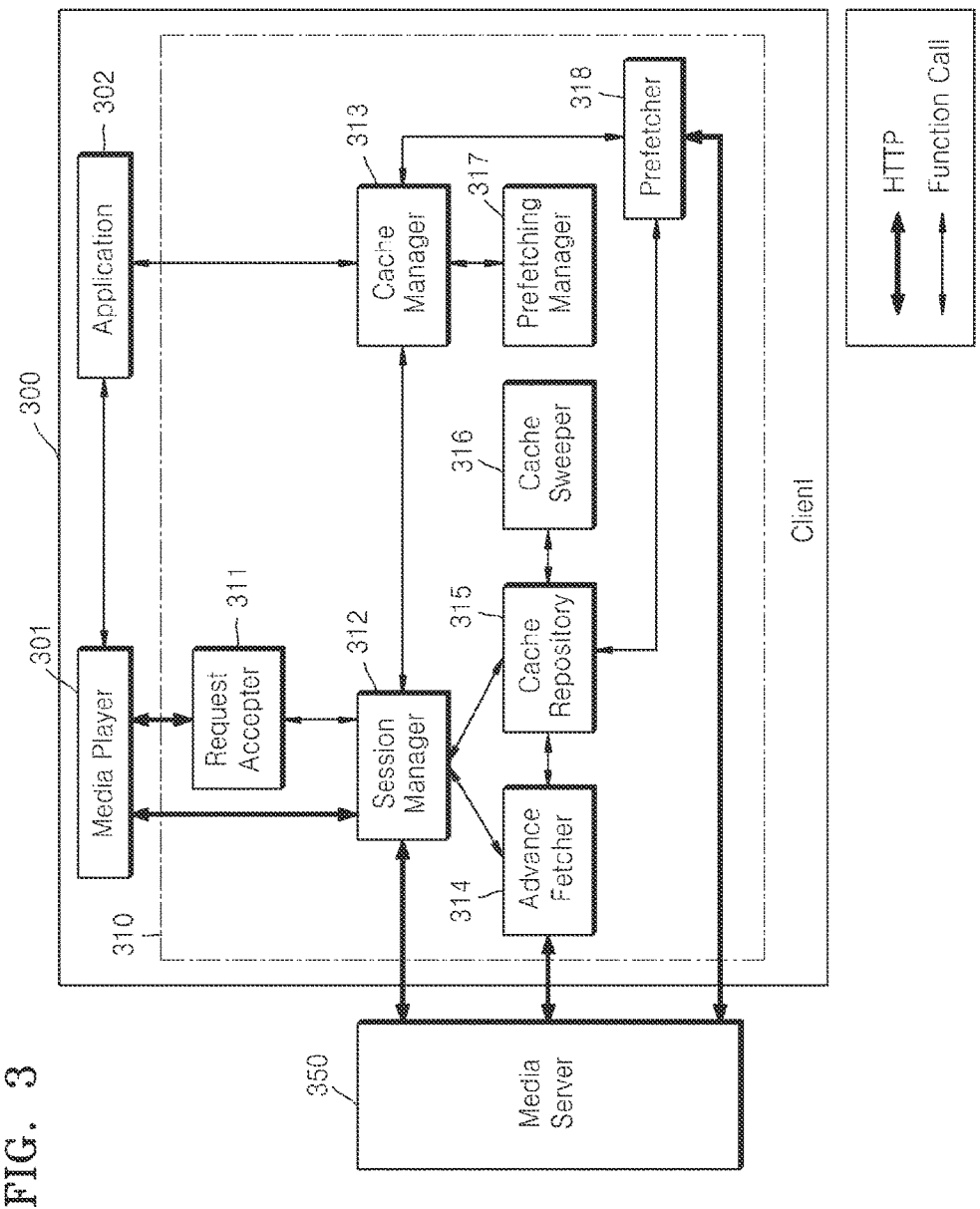
FIG. 3 is a block diagram of a client performing streaming according to an embodiment of the present disclosure.

FIG. 3 is a block diagram of a client 300 performing streaming according to an embodiment of the present disclosure.

Although not shown in FIG. 3, the client 300 includes at least one memory, a processor, and a storage device. Commands for providing a cache service 310 are stored (loaded) in the memory, and the client 300 performs the cache service 310 as the processor executes a program containing the commands. The storage device is used as a cache.

Referring to FIG. 3, the cache service 310 according to the current embodiment includes several service modules. In detail, the cache service 310 includes a request accepter 311, a session manager 312, a cache manager 313, an advance fetcher 314, a cache repository 315, a cache sweeper 316, a prefetching manager 317, and a prefetcher 318. Such service modules may be realized by software, and driven by a Central Processing Unit (CPU) after being loaded in a memory.

The request accepter 311 is an input interface for receiving a streaming request regarding content, i.e., an HTTP request regarding a cache address, from a media player 301. The session manager 312 transmits the content stored in a cache to the media player 301. The cache manager 313 manages an operation of prefetching the content before the streaming request is received. The advance fetcher 314 receives the content from a media server 350 if the content requested to be streamed is not stored in the cache. The cache repository 315 receives data from the session manager 312, the advance fetcher 314, and the prefetcher 318, and reads and writes data from and on the cache (e.g., disk). The cache sweeper 316 manages an available space in the cache. The prefetching manager 317 manages an order of priority of prefetching operations. The prefetcher 318 performs the prefetching operation by receiving the content from the media server 350.

In general HTTP streaming, an application 302, such as a web browser, requests streaming by transmitting a content URL to the media player 301, and the media player 301 performs the streaming by using a memory buffer. However, according to one or more embodiments of the present disclosure, the media player 301 receives a cache URL instead of an original URL. Accordingly, the application 302 operates such that the cache URL is transmitted to the media player 301, instead of the original URL. Here, the application 302 is not limited as long as the content is displayed to a user. The media player 301 is a software module executed to play an actual content file. For example, <Video Player> in an Android Operating System (OS) is the application 302 for displaying a moving image to the user, and an internal player executed to decode an actual moving image file when <Video Player> is executed is the media player 301.

The cache URL includes the original URL as a parameter, and is a URL connectable to the request accepter 311. Upon being requested for the cache URL from the application 302, the cache manager 313 generates the cache URL by converting the original URL, and transmits the cache URL to the media player 301 through the application 302.

The media player 301 requests the request accepter 311 to stream content by transmitting the HTTP request to the request accepter. Upon receiving the HTTP request of the media player 301, the request accepter 311 transmits the HTTP request to the session manager 312, and the session manager 312 determines the original URL by parsing the HTTP request.

The session manager 312 operations differ according to cases when the requested content is not in the cache, when only some data of the requested content is in the cache, and when entire data of the requested content is in the cache. Operations of the service modules will now be described sequentially according to these cases.

First, when none of the data of the content to be played is stored in the cache, the session manager 312 requests the cache manager 313 to temporarily stop all prefetching operations being currently performed in order to prevent a network bandwidth from being consumed in another prefetching operation.

The session manager 312 determines whether to first store the data in the cache and then transmit the data stored in the cache to the media player 301, or to directly transmit the data received from the media server 350 to the media player 301 without storing the data in the cache, according to a size of the requested content. A threshold value of the size being a determination standard may vary according to an embodiment. For example, when the size of the content is smaller than a size of the memory buffer, the content may not be stored in the buffer in order to immediately play the content since data reception from the media server 350 is not stopped even when only the memory buffer is used.

However, when the size of the content is larger than the size of the memory buffer, the data reception is temporarily stopped when the memory buffer is full, and thus the content may be first stored in the cache and then transmitted to the media player 301 in order to continuously receive the data. In this case, the session manager 312 may generate the advance fetcher 314 (for example, an instance of an advance fetcher object), and the advance fetcher 314 receives and stores the content from the server in the cache. The session manager 312 transmits the data stored in the cache to the media player 301. When the content reception from the media server 350 is completed, the session manager 312 or the advance fetcher 314 requests the cache manager 313 to resume the other prefetching operations that have been temporarily stopped.

Meanwhile, even when the size of the content is smaller than the threshold value, the session manager 312 may store the content in the cache to prepare for a case when the content transmitted to the media player 301 is used again later.

Next, the case when only some data of the content is stored in the cache will be described. In this case as well, the session manager 312 requests the cache manager 313 to temporarily stop all prefetching operations being currently performed. Then, the session manager 312 notifies the advance fetcher 314 of information about a chunk not stored in the cache from among the data of the content to be played. The advance fetcher 314 receives only the chunk that is not stored in the cache from the media server 350 based on the information. Here, since the advance fetcher 314 may first receive data that is immediately required for playing, the advance fetcher 314 may priorly receive data that is behind a data offset of a play point of time and adjacent to the play point of time. When the data of the content is stored sequentially in the media server, the data offset may denote an address offset from an address of a play start point of the content to an address of the play point of time. Data that is before the data offset of the play point of time is received after all data behind the data offset is received. The advance fetcher 314 requests the cache manager 313 to resume the prefetching operations that have been temporarily stopped after the data reception is completed.

Lastly, when the entire data of the content is stored in the cache, the session manager 312 is not required to connect to the media server 350 through a network, and thus the cache manager 313 may not stop the prefetching operations. The session manager 312 reads the data of the content from the cache and transmits the read data to the media player 301.

Meanwhile, in order to receive accurate information about the size, name, and Etag of the content from the media server 350, the session manager 312 and the advance fetcher 314 may set a version of the HTTP request, which is transmitted to the media server 350, to 1.0. For example, when a field, such as 'if-non-match' or 'if-range', is used in a header of the HTTP request, the media server 350 does not input information about the size of the content in an HTTP response. Accordingly, even when the media player 301 transmits the HTTP request of version 1.1 to the request accepter 311, the session manager 312 may transmit the HTTP request of version 1.0 to the media server 350.

In all of the three cases described above, the cache service 310 receives the content from the media server 350 after an access request regarding the cache address is received from the media player 301, i.e., a content streaming request. If the downloading of the content immediately starts before the content streaming request from the media player 301, i.e., when the application 302 requests the cache manager 313 for the cache URL, an initial buffering time may be further reduced. Prefetching, which is an operation of starting to download content before a content streaming request is received, will now be described.

Upon receiving a request regarding prefetching, the cache manager 313 receives the data from the media server 350 through the prefetcher 318, and stores the data in the cache. While the prefetcher 318 is receiving the data, the session manager 312 may start to receive the same data based on a request of the media player 301. At this time, the session manager 312 may request the cache manager 313 to stop an operation of the prefetcher 318 regarding the same content. Then, the session manager 312 skips a chunk that has been received and stored in the cache by the prefetcher 318, and receives a remaining chunk. However, if the size of the content is small, the session manager 312 may not cancel the operation of the prefetcher 318 but may instead stream the data stored in the cache to the media player 301 after the downloading performed by the prefetcher 318 is completed. This is because canceling of a prefetching operation and resuming downloading are a waste of resources and may cause a time delay.

The prefetching may not only be performed on one content item, but may also be performed on a plurality of content items. In other words, other content in a playlist may be prefetched, along with content to be immediately played. For example, by prefetching all contents in the playlist, an image slide show may be realized. Also, when all songs in one music album are prefetched while listening to the first song, a buffering delay may not occur when a next song is listened to. The application 302 may request the cache manager 313 to prefetch the playlist, and the cache manager 313 performs prefetching by generating as many prefetchers 318 as a number of content items in the playlist, i.e., many prefetcher instances of a prefetcher object. Here, the prefetching may be performed simultaneously or sequentially. However, since the prefetching of the playlist has a lowest priority from among operations performed by the cache service 310 according to communication with the media server 350, prefetching regarding one content item may be started or temporarily stopped based on a request from the session manager 312 as described above.

In order to efficiently manage an available space of the cache, the cache repository 315 splits and stores data of one content into several chunks and prioritizes the chunks, and the cache sweeper 316 may delete a chunk having a low priority when the available space of the cache needs to be obtained. For example, since the media player 301 first needs header and index information of multimedia content in order to play an image, an initial buffering time may be reduced when chunks including the header and index information are set to have a higher priority than AV data. Alternatively, an order of priority may be determined based on a latest use time, a number of uses, etc. Alternatively, by setting a high priority to chunks of data behind those lastly viewed by the user, a cache hit occurrence rate may be increased as much as possible when the user performs continuous play.

Meanwhile, according to an embodiment of the present disclosure, since the media player 301 connects to the media server 350 through the cache service, the media player 301 using HTTP streaming may also stream the content of the media server 350 that does not support a Transmission Control Protocol (TCP) socket. A general media player receives a URL having the following format from an application for network streaming:

http://{server IP address}: {server port}/{content location}/{contents name}?{parameter}

Upon receiving the above URL, the general media player attempts to connect to a server by using Internet Protocol (IP) address information of the server, and generates and transmits the HTTP request to the server. However, devices hidden behind a Network Address Translation (NAT) or firewall device cannot be connected to by using the above URL. Accordingly, various Peer-to-Peer (P2P) technologies have been developed. One of them is a method of using an Extensible Messaging and Presence Protocol (XMPP) server as a signaling server. Each terminal has an intrinsic full Jabber IDentifier (JID), which is identification used in the Extensible Messaging and Presence Protocol (XMPP) protocol, that is managed by the XMPP server. When a terminal A attempts to connect to a terminal B, the terminal A transmits a full JID of the terminal B to the XMPP server, and connects to the terminal B through the XMPP server. In other words, since a full JID is used instead of an IP address, the general media player is unable to directly use such a method.

However, according to an embodiment of the present disclosure, since the cache service connects to the media server 350, instead of the media player 301, the media player 301 may stream the content of the media server 350 through a P2P connection without any modification. For example, a cache address having a following format may be used:

http://{Request accepter IP address}: {Request accepter port}?method={Connect Method}&target={Target Full JID}&content={Content name}& . . .

In the cache address, an IP address and a port of the media server 350 in the original URL are changed to addresses of the request accepter 311, and a connection method to a counter terminal and information about an address and content of the media server 350 maintain parameter values of the original URL. Upon receiving the cache address having the above format, the media player 301 generates and transmits the HTTP request including parameter information to the request accepter 311, and the request accepter 311 transmits the HTTP request to the session manager 312. The session manager 312 analyzes parameters of the HTTP request to determine which one of various socket interfaces, such as P2P, TCP, and Reliable User Datagram Protocol (RUDP) connections to the media server 350, is required, and then connects to the media server 350 through a suitable connection method. Various types of information as well as a method, a target, and content described above may be further added as parameters. When such a cache address is used, contents streamed from various servers may be used without having to modify the media player 301, and various media players 301 may play the same content. Of course, the cache service may include various socket interfaces which the media player 301 does not include.

Figure 4:
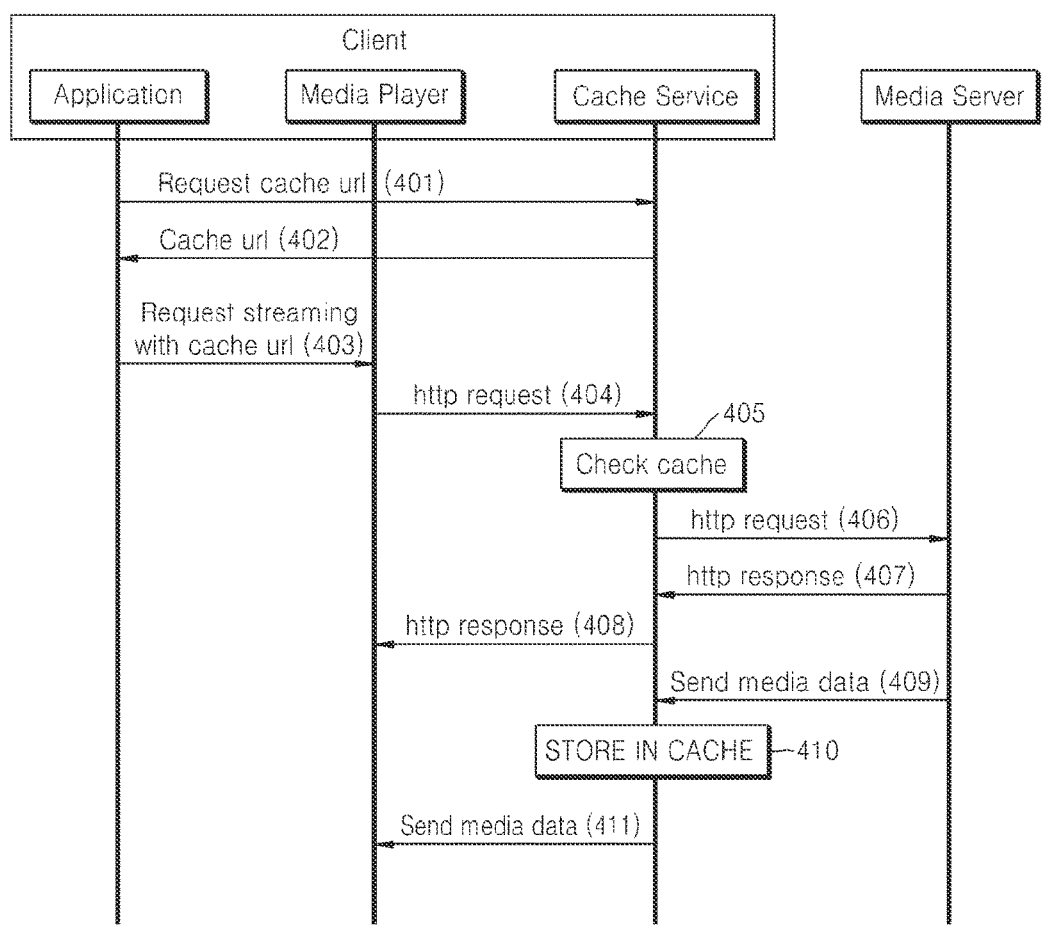
FIG. 4 is a signal flowchart for describing a case when one content item that is not stored in a cache is played according to an embodiment of the present disclosure.

FIG. 4 is a signal flowchart for describing a case when one content item that is not stored in a cache is played according to an embodiment of the present disclosure.

In operation 401, an application requests a cache service for a cache URL. For example, when a web page including a moving image is opened on a web browser, the web browser transmits a URL of the moving image to the cache service, and requests the cache service to convert the URL of the moving image to a cache URL.

In operation 402, the cache service transmits the cache URL to the application.

In operation 403, the application requests a media player to stream (e.g., play) content by transmitting the cache URL to the media player.

In operation 404, the media player recognizes the cache URL as a content URL, generates a HTTP request, and transmits the HTTP request as the cache URL to the cache service so as to request the cache service to stream (e.g., play) the content.

In operation 405, the cache service checks the cache URL transmitted from the media player as described above. That is, in operation 405, the cache service determines whether the requested content is stored in the cache by referring to a parameter of the cache URL. The cache URL is an address indicating the cache service.

In operation 406, the cache service generates a HTTP request by referring to parameters, such as a method, a target, and content, of the cache URL in the HTTP request received from the media player, and transmits the HTTP request to a media server. In the current embodiment, since it is assumed that no data of the content is stored in the cache, the entire data of the content is received from the media server.

In operation 407, the media server transmits a HTTP response to the cache service.

In operation 408, the cache service transmits the HTTP response to the media player.

In operation 409, the media server transmits the content requested through the HTTP request, to the cache service.

In operation 410, the cache service stores the content received from the media server in the cache. In other words, since the content received from the media server is stored in the cache that has a large capacity, instead of in a memory buffer of the media player, data communication between the cache service and the media server is not stopped even when the memory buffer is full while the content is being transmitted.

In operation 411, the cache service streams the data of the content stored in the cache to the media player, and the media player plays the content. As such, since the cache service redirects a streaming request/response between the media player and the media server, the media player may stream the content of the media server even when socket interfaces of the media player and the server are different from each other.

Figure 5:
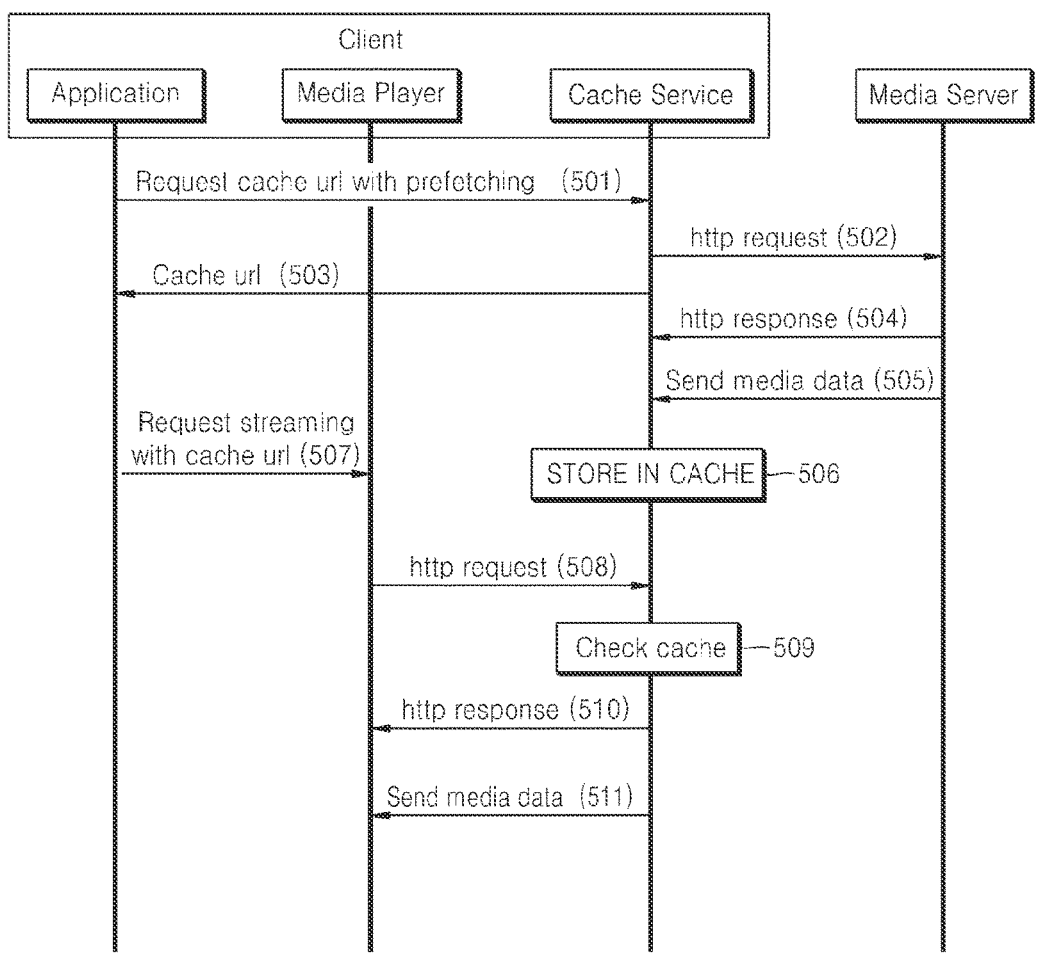
FIG. 5 is a signal flowchart for describing a case when one content item that is not stored in a cache is played according to another embodiment of the present disclosure.

FIG. 5 is a signal flowchart for describing a case when one content item that is not stored in a cache is played according to another embodiment of the present disclosure.

In the current embodiment a media player starts to download content before a cache service requests streaming, unlike the case of FIG. 4, in order to reduce an initial buffering time.

In operation 501, an application transmits an original URL to the cache service and requests (e.g., inquires) a cache URL. Here, a message requesting the cache URL, i.e., a message for calling an Application Program Interface (API) function provided by the cache service, may include a key value requesting prefetching.

In operation 502, the cache service generates and transmits a HTTP request for accessing the content by using the original URL received from the application, to a media server.

In operation 503, the cache service provides the cache URL to the application in response to the request of operation 501.

In operation 504, the media server transmits a HTTP response to the cache service.

In operation 505, the media server transmits the content requested by the cache service.

In operation 506, the cache service stores the content received from the media server in the cache.

In operation 507, the application requests the media player to stream the cache URL.

In operation 508, the media player transmits an access request on the content to be streamed, i.e., a HTTP request on the cache URL, to the cache service.

In operation 509, the cache service checks whether the requested content is stored in the cache.

In operation 510, the cache service returns the HTTP response back to the media player. In the current embodiment, since the corresponding content is stored in the cache, a client is not required to connect to the media server.

In operation 511, the cache service streams the content stored in the cache to the media player.

Figure 6:
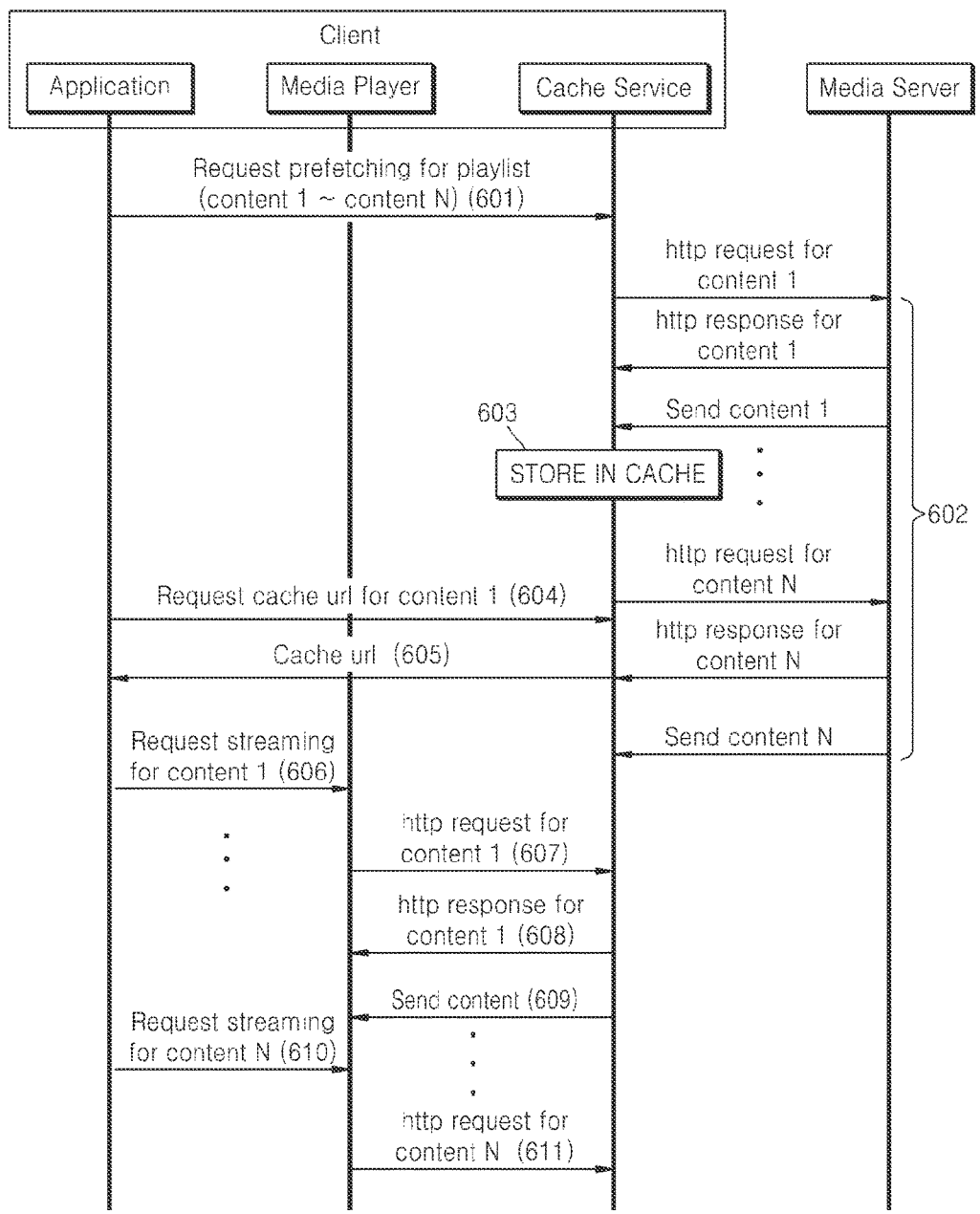
FIG. 6 is a signal flowchart for describing a case when contents of a playlist including several content items are played according to an embodiment of the present disclosure.

FIG. 6 is a signal flowchart for describing a case when contents of a playlist including several content items are played according to an embodiment of the present disclosure.

In operation 601, an application requests a cache service to prefetch all of N contents included in a playlist. Here, an API function being called is assumed to be different from that used in operation 501 of FIG. 5.

In operation 602, the cache service downloads content items in the playlist from a media server. Here, such downloading operations have lower priorities than a downloading operation started by a HTTP request of a media player. For example, when a downloading operation having a priority corresponding to operation 409 of FIG. 4 or operation 505 of FIG. 5 is started while downloading the content items of the playlist, the downloading of the content items of the playlist is temporarily stopped and then resumed when the downloading operation having the priority is completed.

In operation 603, the downloaded content items are stored in a cache.

In operation 604, the application requests for a cache URL of Content 1 from among the content items of the playlist.

In operation 605, the cache service notifies the cache URL of Content 1 to the application.

In operation 606, the application transmits the cache URL of Content 1 to the media player and requests the media player to stream content.

In operations 607 through 609, the cache service streams Content 1 stored in the cache to the media player.

In operations 610 and 611, the cache service reads a content item requested by the media player from among the content items of the playlist, and transmits the read content to the media player.

If all content items of the playlist have been downloaded in the cache before operation 607, the media player may play all contents in the playlist without a buffering time.

In operation 601, the request for prefetching may be performed when the application requests the cache service for a cache URL of one content item or when the application requests the media player to stream content of the cache URL. Alternatively, the request for prefetching may be performed when the media player requests streaming of one content item and downloading of the content item is completed. As described above, since downloading operations according to the request for prefetching in operation 601 have lower priorities than a downloading operation that starts according to a HTTP request of the media player, the contents of the playlist are downloaded after the downloading operation that starts according to the HTTP request of the media player is completed.

According to the current embodiment, even when a user plays one content item, the cache service automatically pre-downloads other contents related to the one content item, i.e., other content items in the playlist. For example, when the user streams one song in an album of his or her favorite singer, the cache service prefetches other songs in the album once music data of the song to be streamed has been downloaded in the cache. Accordingly, the user may listen to the other songs in the album without buffering.

Figure 7:
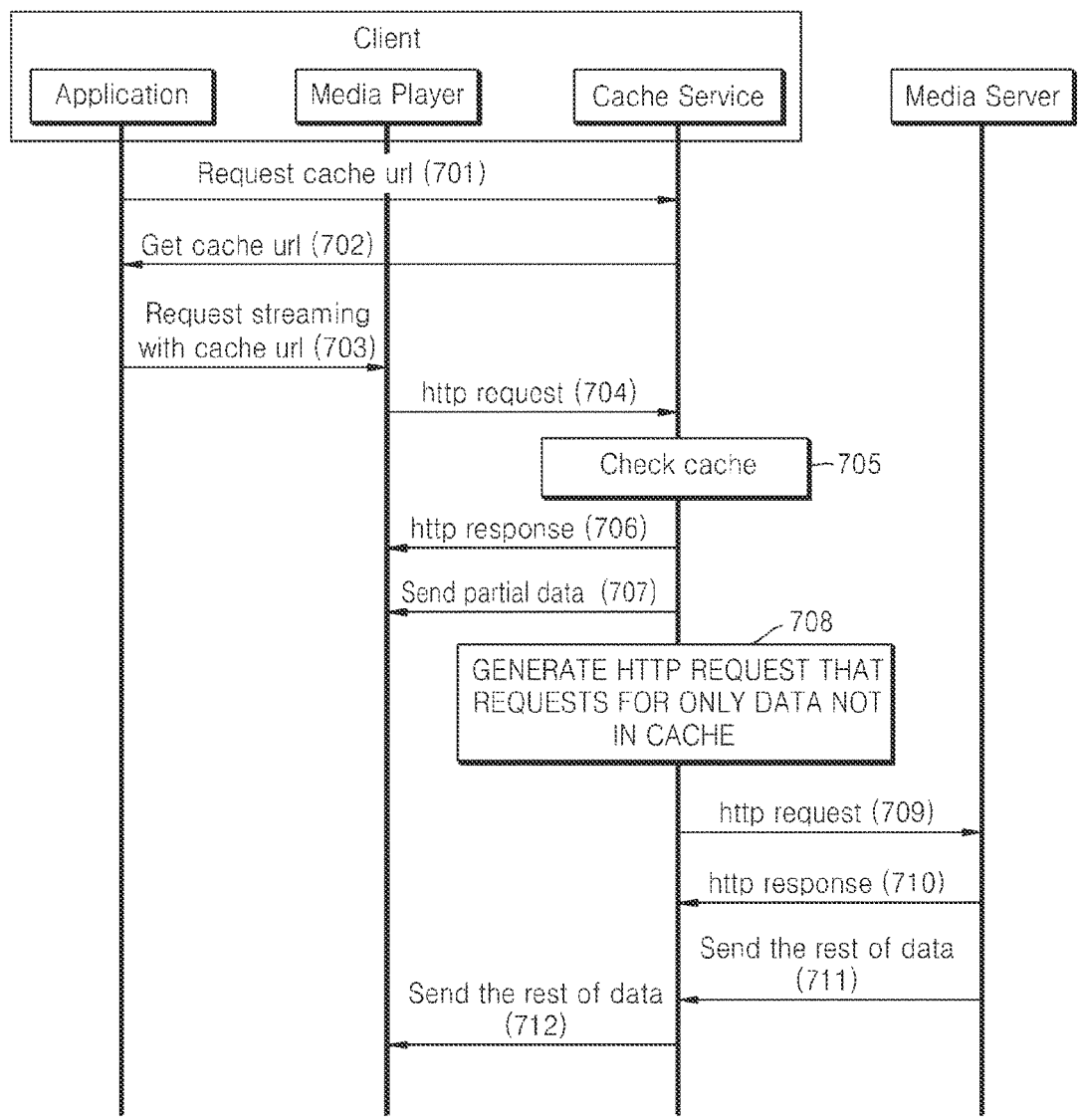
FIG. 7 is a signal flowchart for describing a case when content whose data partially exists in a cache is played according to an embodiment of the present disclosure.

FIG. 7 is a signal flowchart for describing a case when content whose data partially exists in a cache is played according to an embodiment of the present disclosure.

Since operations 701 through 705 are respectively the same as operations 401 through 405 of FIG. 4, details thereof will not be repeated here.

In operation 706, a cache service transmits a HTTP response to a media player.

In operation 707, the cache service first transmits some data of the content stored in the cache to a media player.

In operation 708, the cache service generates a HTTP request for requesting only data not in the cache. Here, the cache service generates the HTTP request such that data having a higher priority from among the data not in the cache is first received. For example, in a moving image file, data including a header and index information has a higher priority than AV data, and AV data having a timestamp closer to a play point of time has a higher priority than other data.

In operation 709, the cache service transmits the HTTP request to a media server.

In operation 710, the media server transmits a HTTP response to the cache service in response to the HTTP request of operation 709.

In operation 711, the media server transmits the requested data to the cache service, and the cache service stores the received data in the cache.

In operation 712, the cache service reads the data received from the media server in operation 711, and transmits the read data to the media player.

Figure 8:
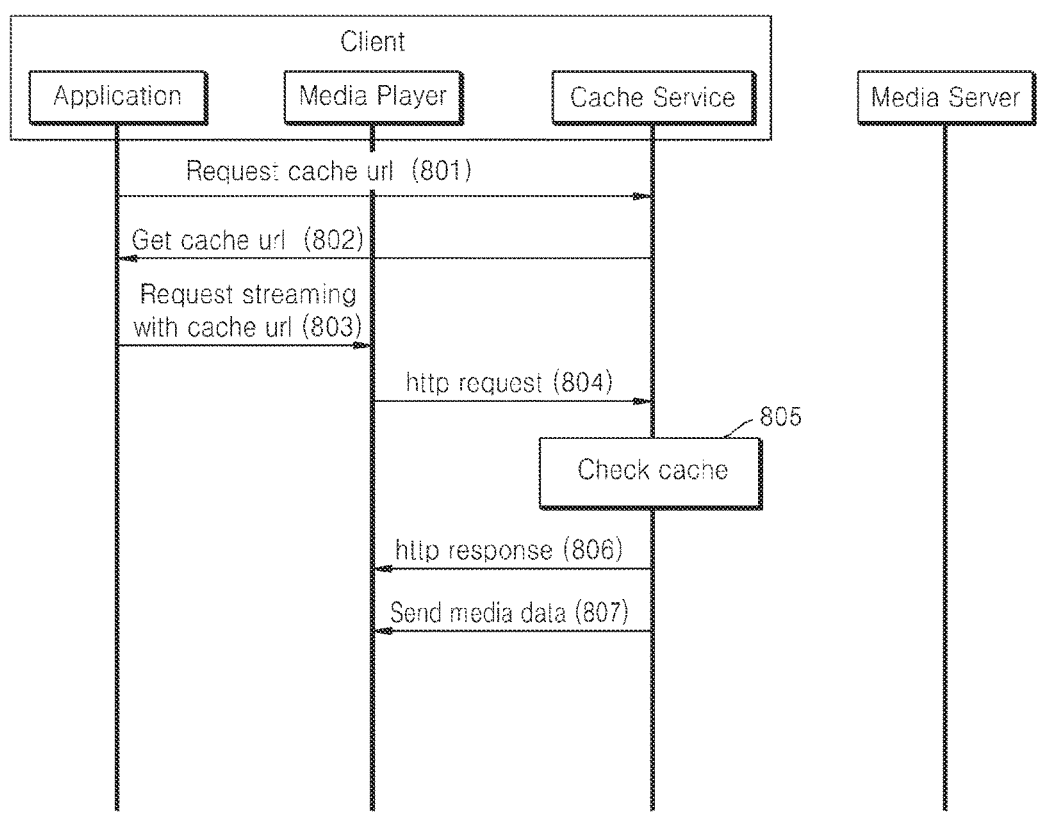
FIG. 8 is a signal flowchart for describing a case when content whose data entirely exists in a cache is played according to an embodiment of the present disclosure.

FIG. 8 is a signal flowchart for describing a case when content whose data entirely exists in a cache is played according to an embodiment of the present disclosure.

Since operations 801 through 805 are respectively the same as operations 401 through 405 of FIG. 4, details thereof will not be repeated here.

In operation 806, a cache service returns an HTTP response to a media player. In the current embodiment, since the entire data of the content requested by the media player is already stored in the cache, the client does not have to connect to a server.

In operation 807, the cache service streams the content stored in the cache to the media player.

Figure 9:
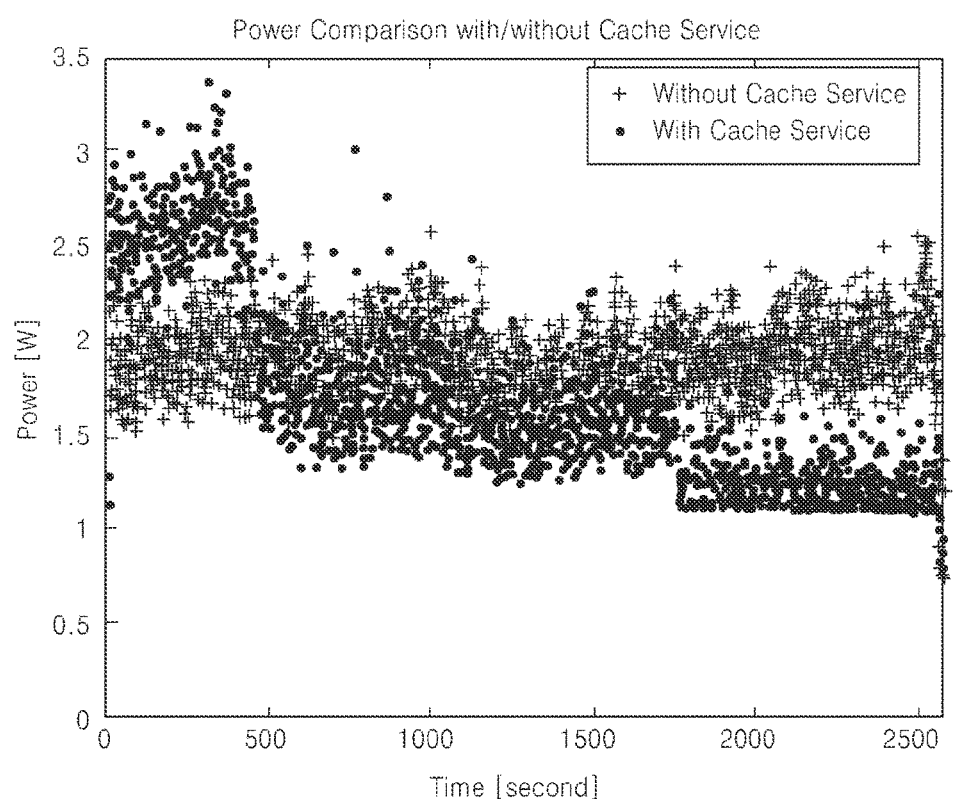
FIG. 9 is a graph showing results of measuring actual power consumption of a client when content is streamed according to an embodiment of the present disclosure.

FIG. 9 is a graph showing results of measuring actual power consumption of a client when content is streamed according to an embodiment of the present disclosure. The content is a video having a resolution of 720 p, a size of 1.1 GB, and a play time of about 41 minutes. As shown in FIG. 9, power consumption is somewhat high during an early play time, but is reduced over time, and thus power consumption is low overall compared to a general streaming method.

According to a streaming method according to an embodiment of the present disclosure, power consumption is higher than a general streaming method using only a memory buffer during an initial play time since reading and writing of data of content received through a network from and to a cache (e.g., a local file disk) are frequently performed. However, after the data is stored in the cache, network resources are no longer used, and thus power consumption is reduced. On the other hand, power consumption is continuously maintained in the general streaming method since a network connection is not ended until playing of the content is almost completed.

Figure 10:
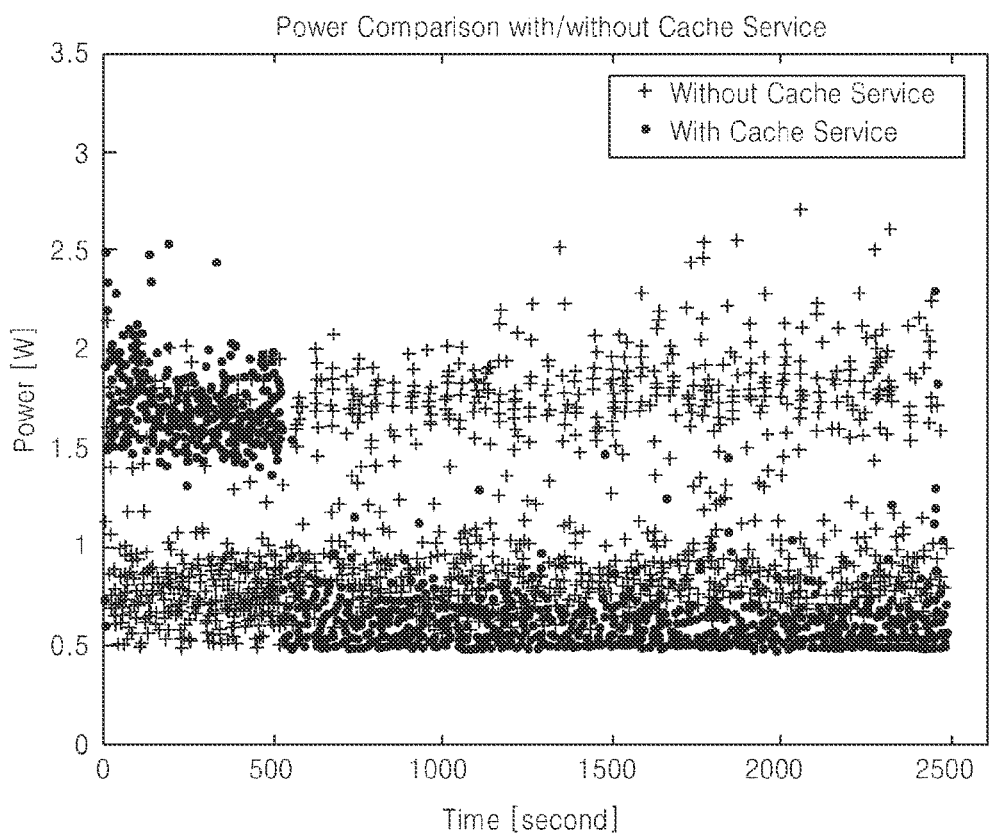
FIG. 10 is a graph showing results of measuring actual power consumption of the media server when content is streamed according to an embodiment of the present disclosure.

FIG. 10 is a graph showing results of measuring actual power consumption of the media server when content is streamed according to an embodiment of the present disclosure. Conditions used for the measuring are to the same as those in FIG. 9.

Referring to FIG. 10, a pattern of the graph showing the actual power consumption of the media server is similar to that of FIG. 9. In other words, power consumption of the media server is high during an initial play time due to read and write operations of the media server and use of network resources, but is remarkably low after data transmission is completed compared to a general streaming method. The power consumption may be further reduced when a speed of the data transmission is increased as a network environment improves.

The embodiments of the present disclosure may be written as computer programs and may be implemented in general-use digital computers that execute the programs using a non-transitory computer-readable recording medium.

Examples of the non-transitory computer-readable recording medium include magnetic storage media (e.g., Read Only Memory (ROM), floppy disks, hard disks, etc.), optical recording media (e.g., Compact Disc (CD)-ROMs, or Digital Versatile Discs (DVDs)), etc.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a media player for streaming content of a server, the method performed by a service of a client, the method comprising:
   receiving, from an application used in controlling the media player, a request for downloading content from a server, wherein the request includes a content address representing an address of the server and identification information of the content;
   prefetching the content from the server and storing the content in a cache in response to the receiving of the request;
   transmitting, in response to the request, a cache address comprising the content address as a parameter and indicating the service to the media player, as an address of the content;
   downloading the content from the server to the cache address of the cache that is a storage space independent from a memory buffer of the media player in the client based on the content address;
   stopping the prefetching of the content in response to an initiation of the downloading; and
   streaming the content stored in the cache to the media player in response to an access request for the cache address,
   wherein the downloading comprises skipping downloading of a portion of the content that has been stored in the cache by the prefetching, and downloading a remaining portion of the content.

2. The method of claim 1, wherein the transmitting of the cache address comprises:
   notifying the application about the cache address in response to the request,
   wherein the downloading is triggered by the request.

3. The method of claim 1,
   wherein, when all of the data of the content is stored in the cache according to the result of the searching for the content, streaming the content stored in the cache to the media player, in response to the access request for the cache address, without requesting the server for any of the data of the content.

4. The method of claim 1, wherein the cache address comprises a parameter indicating a socket interface format that is not supported by the media player but is used to download the content from the server, and
   wherein the downloading comprises connecting to the server by referring to the parameter indicating the socket interface format.

5. The method of claim 1, wherein the downloading comprises, when downloading of the content is completed, starting to download other content in a playlist of the media player.

6. The method of claim 1, wherein the downloading comprises:
splitting and storing data of the content into a plurality of chunks; and
prioritizing the plurality of chunks such that a priority of a chunk comprising a header information or an index information of the content is higher than a priority of a chunk comprising Audio/Video (A/V) data of the content.

7. The method of claim 6, wherein the prioritizing the plurality of chunks further comprises prioritizing the plurality of chunks according to at least one of a generation time, a latest use time, a number of uses, and an attribute of information included in a corresponding chunk.

8. A non-transitory computer-readable recording medium having recorded thereon a program for executing the method of claim 1.

9. A client comprising:
at least one memory; and
a processor configured to activate a service that controls a media player for streaming content of a server, by executing at least one program stored in the at least one memory,
wherein the at least one program comprises commands configured to perform:
receiving, from an application used in controlling the media player, a request for downloading content from a server, wherein the request includes a content address representing an address of the server and identification information of the content,
prefetching the content from the server and storing the content in a cache in response to the receiving of the request,
transmitting, in response to the request, a cache address comprising the content address as a parameter and indicating the service to the media player, as an address of the content,
downloading the content from the server to the cache address of the cache that is a storage space independent from a memory buffer of the media player in the client based on the content address,
stopping the prefetching of the content in response to an initiation of the downloading, and
streaming the content stored in the cache to the media player in response to an access request for the cache address, and
wherein the downloading comprises skipping downloading of a portion of the content that has been stored in the cache by the prefetching, and downloading a remaining portion of the content.

10. The client of claim 9, wherein the transmitting of the cache address comprises:
notifying the application about the cache address in response to the request,
wherein the downloading is triggered by the request.

11. The client of claim 9,
wherein, when all of the data of the content is stored in the cache according to the result of the searching for the content, the at least one program further comprises command configured to perform streaming the content stored in the cache to the media player, in response to the access request for the cache address, without requesting the server for any of the data of the content.

12. The client of claim 9, wherein the cache address comprises a parameter indicating a socket interface format that is not supported by the media player but is required to download the content from the server, and
wherein the downloading comprises connecting to the server by referring to the parameter indicating the socket interface format.

13. The client of claim 9, wherein the downloading comprises, when downloading of the content is completed, starting to download other content in a playlist of the media player.

14. The client of claim 9, wherein the downloading comprises:
splitting and storing data of the content into a plurality of chunks; and
prioritizing the plurality of chunks such that a priority of a chunk comprising a header information or an index information of the content is higher than a priority of a chunk comprising Audio/Video (A/V) data of the content.

15. The client of claim 14, wherein the prioritizing the plurality of chunks further comprises prioritizing the plurality of chunks according to at least one of a generation time, a latest use time, a number of uses, and an attribute of information included in a corresponding chunk.

* * * * *